Jan. 7, 1964 E. F. WEBB 3,116,759
FLEXIBLE TUBING STRUCTURE
Filed Jan. 3, 1961
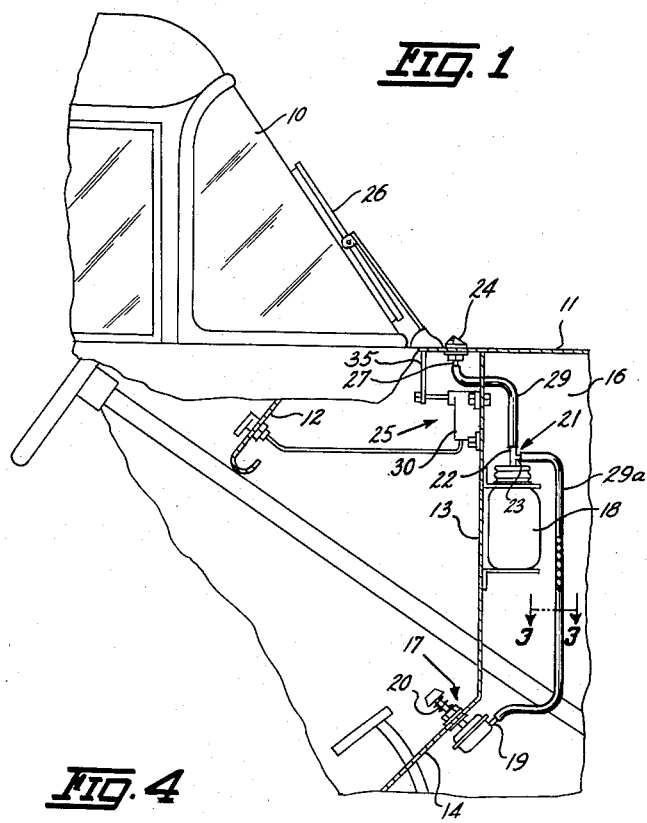
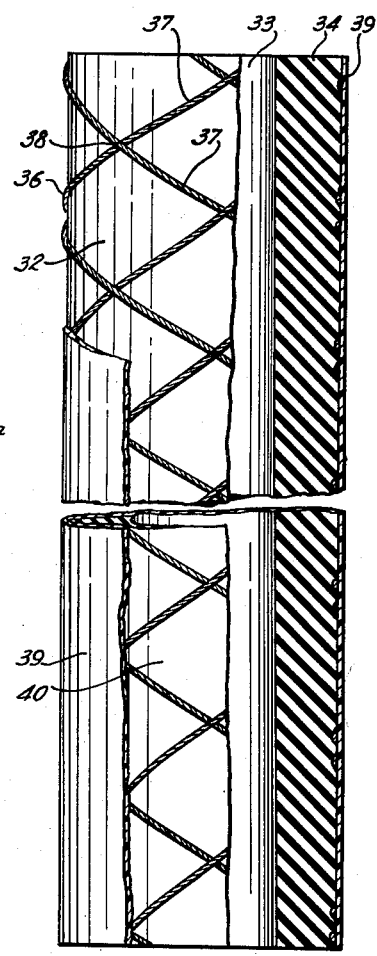
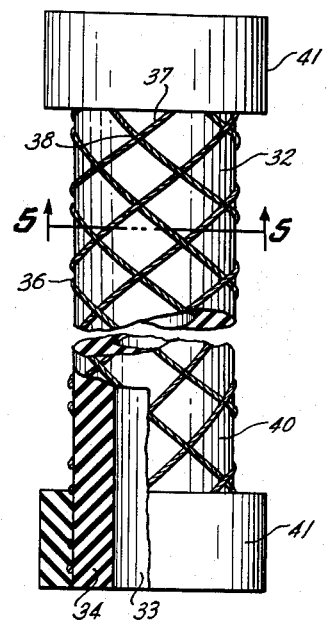
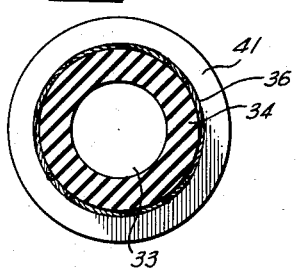
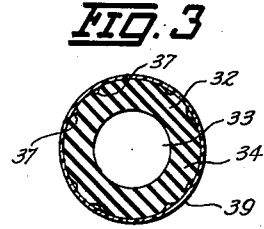
INVENTOR.
EDMOND F. WEBB
BY Lowell + Henderson
ATTORNEYS.

3,116,759
FLEXIBLE TUBING STRUCTURE
Edmond F. Webb, Franklin, Mich., assignor to The Delman Company, Cookeville, Tenn., a corporation of Tennessee
Filed Jan. 3, 1961, Ser. No. 80,175
2 Claims. (Cl. 138—125)

This invention relates generally to flexible tubing and in particular to a vinyl tubing structure having a reinforcement sheath of an open mesh fabric material.

Flexible tubing of small diameter, on the order of about one-quarter of an inch, composed of a rubber or polyethylene or vinyl material is commercially available for use in various fluid systems such as in the washer system of a vehicle windshield clearing apparatus. In this type of apparatus it is necessary that the tubing stand up under liquid operating pressures in excess of 30# per square inch while subjected to varying temperatures as produced by climatic conditions and under the hood engine heat conditions, so that these temperatures may vary from below zero degrees F. up to about one hundred eighty degrees F. Additionally, in the installation of the apparatus, the tubing must be capable of withstanding appreciable bending, without taking a permanent set or kink which would impair a free flow of liquid through the tubing. This bending is necessary to provide for the connection of the tubing between component parts of the windshield clearing apparatus, which are generally located at different positions not only within the vehicle engine compartment, but at times outside of the engine compartment.

Rubber tubing has been found to be generally unsatisfactory for use in a vehicle windshield clearing apparatus. To begin with, extruded rubber requires wax for aging. This wax bleeds out of the rubber, both to the inside and to the outside of the tubing, and must be scraped from the inside of the tubing for installation of the tubing over a fitting. The scraped wax, as well as later bled wax, travels through the tubing with the liquid flow and collects and clogs restricted passages formed in the valves and nozzles of the clearing apparatus. More serious objections to rubber tubing are its tendency to crack at the fittings, and the inability to provide for the inspection of the quality of the tubing without the use of expensive and complex testing equipment. Reclaimed rubber is often used in the manufacture of this type tubing and its presence is practically impossible to detect without running tensile strength tests on the tubing. As a result rubber tubing, from even the same source, varies in composition in different shipments so that quality control by the purchaser is most difficult to maintain.

Tubing of polyethylene type is generally unsatisfactory due to its rigidity or lack of flexibility which makes it difficult to handle for push on connections with fittings, and when overstressed in making such connections, it frequently cracks. Also when polyethylene tubing is bent or kinked it tends to take a permanent set in the bent position.

Extruded soft vinyl tubing, generally composed of a thermoplastic resin formed by the polymerization of a vinyl compound, such as a vinyl acetate, is generally satisfactory for use in a windshield clearing apparatus by virtue of its flexibility for bending, without setting, and its ease of handling in making push on connections with fittings. However, it has been found that this type of tubing has a tendency to explode or blow out at temperatures as low as one hundred fifty degrees F., when carrying fluid pressures in the neighborhood of about 30# per square inch. The purpose of this invention is to utilize the advantageous features of this type vinyl tubing in a vinyl tubing structure which overcomes the disadvantage of blowout.

It is an object of this invention, therefore, to provide an improved vinyl tubing structure.

A further object of this invention is to provide an improved tubing structure wherein a soft vinyl tubing is encased by an open mesh fabric material to reinforce the sidewall of the tubing without impairing the inherent flexibility of the tubing.

Another object of this invention is to provide an improved tubing structure wherein an open mesh fabric sheath for a soft vinyl tubing is secured with the tubing in a manner to prevent unraveling of the sheath between the ends of the tubing.

Further objects, features and advantages of this invention will become apparent from the following description when taken in connection with the accompanying drawing in which:

FIG. 1 is a fragmentary foreshortened longitudinal sectional view of a vehicle showing assembled thereon a windshield clearing apparatus embodying the tubing structure of this invention;

FIG. 2 is an enlarged side elevational view of the tubing structure illustrated in FIG. 1, with some portions shown in section and other portions broken away to more clearly show its construction;

FIG. 3 is a cross sectional view taken along the line 3—3 in FIG. 1.

FIG. 4 is a side elevational view of a modified form of tubing structure with some parts illustrated in section and other parts broken away for the purpose of clarity; and FIG. 5 is a detail sectional view as seen along the line 5—5 in FIG. 4.

With reference to the drawing there is illustrated in FIG. 1 a windshield clearing apparatus as applied to an automobile having a windshield 10, an engine cowl 11 extended forwardly from the windshield and an instrument panel 12 located rearwardly of the windshield. The automobile is further equipped with the usual fire wall 13, floor board 14 and engine compartment 16, only a portion of which is illustrated in FIG. 1.

The clearing apparatus includes a foot pump unit 17, supported on the floor board 14, and a liquid container 18 carried on the front side of the firewall 13 so as to be located within the engine compartment 16. The pump 17 is of a usual diaphragm type having a depressible foot plunger 20 and a single fluid fitting or connection 19. A two-way valve unit 21 carried on the container 18 has fluid fittings 22 and 23. A nozzle 24, mounted on the automobile at a position to project fluid onto the windshield 10 in the path of a wiper blade 26 has a fluid fitting 27. The wiper blade 26 forms part of a wiper unit indicated generally at 25 and including a wiper motor 30 connected with the blade 26 through a transmission system 35 of a usual type.

Flexible tubing structures of this invention, designated generally as 29 and 29a, are of an identical construction, with the tubing 29a being connected to the pump fitting 19 and the valve fitting 23, and with the tubing 29 being connected to the valve fitting 22 and the fitting 27 of the nozzle 24.

On depression of the plunger 20, water is forced through the tube structures 29 and 29a and through the nozzle 24 onto the windshield 10. When the plunger 20 is released, liquid from the container 18 is drawn into the pump 17 through the tubing structure 29a; the valve unit 21 acting to close the container 18 when liquid is discharged from the pump 17, and to close the flow of liquid through the tubing 29 and to open the container 18, when the pump is being discharged.

As illustrated, the tubings 29 and 29a have portions located within the engine compartment 16 within which the temperature from engine heat may reach one hundred eighty degrees F. or more. Also, the pump unit of diaphragm type is capable of effecting fluid pressures in excess of 35# per square inch, with the variations in pump pressure being dependent upon the rate of movement of the pump plunger by the vehicle operator. As previously mentioned commercially available vinyl tubing is generally satisfactory for use with windshield clearing devices of the type illustrated, except for its inability to consistently withstand pressures of about 30# per square inch at temperatures of about one hundred fifty degrees F.

As shown in FIGS. 2 and 3 the vinyl tubing structure of this invention includes a commercially available tubing member 32 of a vinyl composition, formed with a central fluid passage 33 having a sidewall 34. The tubing 32 is encased within an open mesh fabric sheath 36 formed by winding fabric cord or thread 37 in spiral paths about the tubing. The cords or threads 37 may be multi-strand, and when wrapped or wound about the tubing 32, are in an overlapped relation at their crossings or junctions indicated at 38. Also, as illustrated, the fabric cords 37 are alternately one under the other at their intersections or crossings 38 so as to be interlaced longitudinally of the tubing member 32.

To prevent the mesh sheath 36 from becoming unraveled from the tubing 32, this composite assembly is dipped into a vinyl liquid composition to form a vinyl surface coating 39. This composition may consist of a vinyl molding powder dissolved in Du Pont tetrahydrofluran for air drying at room temperature to form the coating 39.

In use, when the tubing structure 29 or 29a, which are of identical construction, is subjected to fluid pressures of about 30# per square inch and temperatures in the neighborhood of about one hundred fifty degrees F., the sidewall 32 will bulge out outwardly through the openings 40 of the mesh sheath 36. However, since this bulging is localized over an area corresponding to the area of a mesh opening 40, blowout of the tubing is completely eliminated. Additionally, since the fabric sheath is merely wrapped about the tubing, the normal flexibility of the vinyl tubing is retained for push on connection of its ends with fluid fittings such as 19 and 23.

A modified form of tubing structure 42 is shown in FIGS. 4 and 5, wherein the vinyl tubing member 32 and fabric sheath 36 are of a construction and relative assembly the same in all respects as the like parts in FIGS. 2 and 3, except for the vinyl coating 39. In the modified form of FIGS. 4 and 5, the sheath 36 is maintained against unraveling from the ends of the tubing 32 by the provision of flexible sleeves or collars 41, there being a sleeve 41 at each end of the tubing 32. Each sleeve 41 is of a vinyl composition and of a size to fit, in a telescopic relation, over a corresponding tubing end, so that the fabric sheath 36 at such ends is frictionally held between the tubing wall 32 and the sleeves 41. The flexibility of the sleeves 41 permits convenient connection of the tubing with fluid fittings, with the sheath 36 and the tubing structure 42 functioning in all respects the same as in the tubing structure of FIGS. 2 and 3.

Although the invention has been shown and described relative to preferred embodiments thereof, it is to be understood that it is not to be so limited since changes and modifications can be made therein which are within the full intended scope of this invention as defined by the appended claims.

I claim:

1. A tubing structure for conducting fluid under pressure including a vinyl tubular body member, an open mesh sheath of a fabric material having spaced and intersecting cords loosely encasing said body member, whereby to retain the inherent flexibility of said body member to bend and expand, and means for holding said sheath from becoming unraveled from said body member, said sheath, when said body member is conducting fluid under pressure, acting to localize the expansion of said body member to separate areas thereof defined by the spaced and intersecting cords.

2. The tubing structure defined in claim 1 wherein said means for holding said sheath from becoming unraveled comprises resilient vinyl sleeves mounted about the ends of said body member to frictionally hold the fabric sheath between the body member and the sleeves.

References Cited in the file of this patent

UNITED STATES PATENTS

| | | |
|---|---|---|
| 323,149 | Holt | July 28, 1885 |
| 334,951 | Holt | Jan. 26, 1886 |
| 837,602 | Benenato | Dec. 4, 1906 |
| 1,230,867 | Cobb | June 26, 1917 |
| 2,160,371 | Schnabel | May 30, 1939 |
| 2,515,929 | Ofeldt | July 18, 1950 |
| 2,752,952 | Dauphinais | July 3, 1956 |
| 2,754,848 | Knowland et al. | July 17, 1956 |
| 2,865,978 | Modrey | Dec. 23, 1958 |
| 2,917,102 | Mahady | Dec. 15, 1959 |

FOREIGN PATENTS

| | | |
|---|---|---|
| 850,421 | Great Britain | Oct. 5, 1960 |